United States Patent
Jiang et al.

(10) Patent No.: US 10,197,006 B2
(45) Date of Patent: Feb. 5, 2019

(54) FRICTION-WELDED STRUCTURE ASSEMBLY, WATER-COOLED INTERNAL COMBUSTION ENGINE CYLINDER HEAD, WATER-COOLED INTERNAL COMBUSTION ENGINE AND MACHINE EQUIPPED WITH SAME

(71) Applicants: Shanghai Jiaotong University, Shanghai (CN); Yimin Jiang, Shanghai (CN); Yaofu Jiang, Jiangsu (CN)

(72) Inventors: Yaofu Jiang, Jiangsu (CN); Wenjiang Ding, Shanghai (CN); Liming Peng, Shanghai (CN); Penghuai Fu, Shanghai (CN); Yongkui Zhu, Shanghai (CN)

(73) Assignees: Shanghai Jiaotong University (CN); Yimin Jiang (CN); Yaofu Jiang (CN)

( * ) Notice: Subject to any disclaimer, the term of this patent is extended or adjusted under 35 U.S.C. 154(b) by 0 days.

(21) Appl. No.: 15/028,692

(22) PCT Filed: Dec. 22, 2014

(86) PCT No.: PCT/CN2014/094488
§ 371 (c)(1),
(2) Date: Apr. 11, 2016

(87) PCT Pub. No.: WO2015/096675
PCT Pub. Date: Jul. 2, 2015

(65) Prior Publication Data
US 2016/0265473 A1    Sep. 15, 2016

(30) Foreign Application Priority Data
Dec. 23, 2013 (CN) .......................... 2013 1 0746251
May 8, 2014 (CN) .......................... 2014 1 0192685

(51) Int. Cl.
B23K 20/12 (2006.01)
F02F 1/36 (2006.01)
(Continued)

(52) U.S. Cl.
CPC ................ F02F 1/36 (2013.01); B23K 20/12 (2013.01); B23K 20/129 (2013.01); F01L 3/08 (2013.01);
(Continued)

(58) Field of Classification Search
None
See application file for complete search history.

(56) References Cited

U.S. PATENT DOCUMENTS 3,477,115 A * 11/1969 Martin ................. B23K 20/129
228/114.5
3,495,321 A * 2/1970 Haren .................. B23K 20/129
228/114

(Continued)

FOREIGN PATENT DOCUMENTS

CN    1651776 A    8/2005
CN  101157158 A    4/2008
(Continued)

*Primary Examiner* — Devang R Patel
(74) *Attorney, Agent, or Firm* — St. Onge Steward Johnston & Reens, LLC

(57) ABSTRACT

The invention provides a friction-welded structure assembly, comprising a first workpiece (10B), a second workpiece (10C) and a friction welding connecting part (10A). The lower side of the friction welding connecting part (10A) has a first friction welding junction interface (10H) which is in contact with a surface of the first workpiece (10B) and a second friction welding junction interface (11H) which is in contact with a surface of the second workpiece (10C). The friction welding connecting part (10A) is tightly pressed on both the first workpiece (10B) and the second workpiece (10C) which are positioned to be relatively corresponding (Continued)

and fixed to each other, while being moved under a pressure, so as to heat said first friction welding junction interface (10H) and said second friction welding junction interface (11H), then said friction welding connecting part (10A) is stopped under the pressure, and said first friction welding junction interface (10H) and said second friction welding junction interface (11H) become cool, thereby said first workpiece (10B) and said second workpiece (10C) are welded together to form the friction-welded structure assembly via said friction welding connecting part (10A). Also, The invention relates to a water-cooled internal combustion engine cylinder head using the friction-welded structure assembly described above.

6 Claims, 13 Drawing Sheets

(51) Int. Cl.
*F02F 1/24* (2006.01)
*F02F 1/42* (2006.01)
*H05B 6/02* (2006.01)
*F01L 3/08* (2006.01)
*B23K 101/00* (2006.01)

(52) U.S. Cl.
CPC ............ *F02F 1/242* (2013.01); *F02F 1/4285* (2013.01); *H05B 6/02* (2013.01); *B23K 2101/006* (2018.08); *F02F 2001/244* (2013.01); *F02F 2001/249* (2013.01); *F02F 2200/00* (2013.01)

(56) References Cited

U.S. PATENT DOCUMENTS

| | | | |
|---|---|---|---|
| 7,726,541 B2 * | 6/2010 | Maciel | ................ B23K 20/122 228/112.1 |
| 2011/0182657 A1 * | 7/2011 | Eberhard | ............. B23K 20/129 403/271 |
| 2012/0037115 A1 | 2/2012 | Schnaiter et al. | |

FOREIGN PATENT DOCUMENTS

| | | | |
|---|---|---|---|
| CN | 100553850 C | 10/2009 | |
| CN | 101678499 A | 3/2010 | |
| CN | 1840886 B | 12/2010 | |
| CN | 101992348 A | 3/2011 | |
| CN | 102251873 A | 11/2011 | |
| CN | 102390017 A | 3/2012 | |
| CN | 102537146 A | 7/2012 | |
| CN | 102678352 A | 9/2012 | |
| CN | 102865154 A | 1/2013 | |
| CN | 202991254 U | 6/2013 | |
| CN | 103260808 A | 8/2013 | |
| CN | 103452690 A | 12/2013 | |
| CN | 203809142 U | 9/2014 | |
| CN | 203948184 U | 11/2014 | |
| DE | 19919883 A1 * | 11/2000 | ............. B23K 20/12 |
| GB | 1011129 A * | 11/1965 | ........... B23K 20/129 |
| JP | 2008272818 A * | 11/2008 | |
| WO | WO-2006131212 A1 * | 12/2006 | ............. B23K 20/12 |

* cited by examiner

FRICTION-WELDED STRUCTURE ASSEMBLY, WATER-COOLED INTERNAL COMBUSTION ENGINE CYLINDER HEAD, WATER-COOLED INTERNAL COMBUSTION ENGINE AND MACHINE EQUIPPED WITH SAME

FIELD OF THE INVENTION

The invention relates to a friction-welded structure assembly, a water-cooled internal combustion engine cylinder head using the structure assembly, a water-cooled internal combustion engine having the cylinder head, and a machine equipped with the water-cooled internal combustion engine.

TECHNICAL BACKGROUND

Existing water-cooled internal combustion engine cylinder heads, especially the cylinder heads of multi-cylinder engines, have a cooling water chamber which has a complicated shape and is closed in a cylinder head housing. Because of the complicated shape, nowadays the cylinder heads are manufactured in a complex casting process with sand cores. In such a casting process, it is difficult to remove the sand cores and to clean the castings so that the castings often present rather rough surfaces. And, such a casting process is of high cost and trends to pollute environment. Therefore, there is a need to create a new configuration and structure of water-cooled internal combustion engine cylinder head, so as to manufacture water-cooled internal combustion engine cylinder heads in a pressure casting (or die casting) process using light alloys.

CN202991254U and CN103452690A discloses a solution of manufacturing a two-part internal combustion engine cylinder head in which an upper cylinder head part and a lower cylinder head part are manufactured separately and then the upper part and lower part are jointed into an integral cylinder head by welding, adhering, screw-fastening or riveting process. Thus, it provides a solution for manufacturing a basic configuration and structure of the water-cooled cylinder head by die casting process using light alloys. However, such a cylinder head still has some deficiencies in design and manufacture process that will be pointed out in detail hereinafter.

As far as welding is concerned, it is done in this way: firstly, a first workpiece is inserted into a hole corresponding thereto in a second workpiece, and then by welding the two workpieces at the edge of the hole mouth, the two workpieces are welded together and into a welded structure assembly. In the existing art, welding is conducted along and in the gap at the hole mouth and between the first workpiece and second workpiece so as to form an endless and sealing weld joint along the hole mouth edge, for example, by arc welding, gas welding, friction stir welding, or flash butt welding, thereby the two workpieces are jointed together and the gap between them at the hole mouths is sealed. However, in the case that the junction interface of the two workpieces is in a narrow space at the hole mouth, it is very difficult for a welding gun to reach the junction interface to conduct welding. Further, in the case that the junction interface is in a narrow space and it is necessary to rapidly complete welding of densely-disposed plural junction interfaces between the two workpieces at the hole mouths, it is very hard for the tools for arc welding or gas welding to reach the junction interfaces so that it is impossible to conduct high-speed welding. Likewise, it is very difficult for the stirring needle jig of friction stir welding to be inserted into a narrow space to follow a stirring track. As to flash butt welding, for welding densely-disposed plural junction interfaces between two workpieces at the hole mouths, the welding process is very difficult, welding cost will be very high, and deformation of workpieces caused by welding is hard to be solved. Even if the welding processes mentioned above could be carried out successfully, the surfaces of the weld joints obtained would be very rough or uneven, so that they need to be ground. As well known, grinding is time-consuming and its final result may be unsatisfactory.

CN101992348A discloses a surface junction configuration between a first workpiece and a second workpiece as well as a friction welding method therefor, wherein the adjoining surfaces of the two workpieces form a welded junction interface by relatively reciprocating or rotating motion so as to heat the adjoining surfaces by friction heat to a friction welding temperature. The adjoining surfaces are stopped under a pressure, and then to be cooled. CN102537146A discloses a friction stir welding configuration used for the bottom of a disc brake. CN1651776A discloses a rotary friction welding configuration used for a cross joint of tubular workpieces. CN1840886B discloses a rotary friction welding configuration between common rail parts of a diesel engine. CN101157158A discloses a rotary friction welding configuration between a steel workpiece and an aluminum workpiece. CN100553850C discloses a method and a system of inertia friction welding. CN103260808A discloses a technical solution for electric heating, sliding and press bonding between separately pressure-casted parts of a cylinder head. All the above-mentioned workpiece configurations in the prior arts, so far, still cannot be directly applied to weld densely-disposed plural junction interfaces at the hole mouths between a first workpiece and a second workpiece, the process requires to complete welding at a high speed in a narrow space. Therefore, there is an urgent need to create a new welding configuration and structure in which it is possible to insert a first workpiece in a hole corresponding thereto in a second workpiece and to weld the two workpieces together at their hole mouths, meanwhile, welding is carried out quickly, economically, reliably, and aesthetically.

CN102678352A discloses a water-cooled internal combustion engine cylinder head fitted with a sparking plug for ignition, fuel is injected into an intake duct and mixed with fresh air therein, and then enters an engine cylinder through an intake valve and is ignited and burned in the cylinder. CN102251873A discloses a water-cooled internal combustion engine cylinder head with a centrally disposed direct-injection fuel injector, the fuel injector and the sparking plug are positioned in a central concave portion of the cylinder head. CN102865154A discloses a water-cooled internal combustion engine cylinder head with a tilted direct-injection fuel injector, the fuel injector is mounted in a side wall of the water-cooled cylinder head.

As mentioned above, CN202991254U and CN103452690A discloses a technical solution of a water-cooled cylinder head in which the cylinder head is integrated by an upper part and a lower part which are manufactured separately, and the two parts are joined together to form a integrated water-cooled cylinder head by a process such as welding, adhering, screw-fastening and/or riveting. This makes the configuration and structure of multi-part water-cooled cylinder head get further improvement and provides a basic configuration and structure solution of a water-cooled cylinder head that can be formed of light alloys by die-casting. However, in welding cylinder head bolt receiving holes, a fuel injector receiving hole, intake and exhaust valve stem receiving holes, intake and exhaust duct holes and a sparking plug receiving hole of a cylinder head formed of aluminum alloys or magnesium alloys, their upper hole portions and their lower hole portions respectively in the upper cylinder head part and the lower cylinder head part are connected with each other. In the case that the upper cylinder head part and lower cylinder head part are welded together into a cylinder head by welding, such as arc welding, gas welding, friction stir welding and flash butt welding, between the upper cylinder head part and lower cylinder head part, it is impossible to solve the technical problems, such as narrow spaces for welding, high-speed welding, little deformation, reliable sealing and aesthetical appearance. Therefore, there is an urgent need to create a new welding configuration between an upper cylinder head part and a lower cylinder head part of a water-cooled internal combustion engine cylinder head, which allows to weld the upper cylinder head part and the lower cylinder head part into an integrated cylinder head of a water-cooled internal combustion engine by using a quick, economic and reliable welding process.

SUMMARY OF THE INVENTION

Accordingly, the object of the present invention is to provide a new friction-welded structure assembly which allows to weld an upper cylinder head part and a lower cylinder head part into an integrated cylinder head of a water-cooled internal combustion engine quickly, economically and reliably.

In order to realize the object above, the present invention provides a new friction-welded structure assembly comprising: a first workpiece, the first workpiece having a support shoulder; a second workpiece, the second workpiece having a throughhole corresponding to the first workpiece, and the second workpiece being supported at its lower portion on the support shoulder of the first workpiece; and a friction welding connecting part, the friction welding connecting part having, at its lower portion, a first friction welding junction interface which is in contact with a surface of the first workpiece, and a second friction welding junction interface which is in contact with a surface of the second workpiece, wherein the friction welding connecting part is tightly pressed on both the first workpiece and the second workpiece which are positioned to be relatively corresponding and fixed to each other, while being moved under a pressure, so as to heat the first friction welding junction interface and the second friction welding junction interface, then the friction welding connecting part is stopped under the pressure, and the first and second friction welding junction interfaces become cool, thereby the first workpiece and the second workpiece are welded together to form the friction-welded structure assembly via the friction welding connecting part.

Preferably, the first workpiece has a first workpiece internal hole, and the friction welding connecting part has a friction welding connecting part internal hole, in the friction-welded structure assembly formed by welding the first workpiece and the second workpiece via the friction welding connecting part, the friction welding connecting part internal hole is aligned with the first workpiece internal hole.

Preferably, the friction welding connecting part is provided with engaging edges on an outside wall of one end thereof and/or on an inside wall of one end thereof.

Preferably, the friction welding connecting part has an extended reinforcing portion.

Preferably, the first friction welding junction interface and the second friction welding junction interface of the friction welding connecting part are in the same planar and/or curved surface.

Preferably, the friction welding connecting part has a stepped-like shape so that the first friction welding junction interface and the second friction welding junction interface of the friction welding connecting part are in two height-different planar and/or curved surfaces.

Preferably, the friction welding connecting part is tightly pressed on both the first workpiece and the second workpiece which are positioned to be relatively corresponding and fixed to each other, while being rotated or reciprocated under a pressure.

Preferably, the first workpiece, the second workpiece and/or the friction welding connecting part are made of metal materials and/or synthetic materials.

Preferably, the first workpiece, the second workpiece and/or the friction welding connecting part are made of aluminum alloys, magnesium alloys and/or titanium alloys.

Further, the invention provides a chucking device for friction-welding a friction-welded structure assembly, comprising: a rotary pressing jig; and a first chucking jaw and a second chucking jaw which are fixed to the rotary pressing jig, wherein at a front end of at least one of the first and second chucking jaws, at least one scraping blade is provided.

Preferably, the first chucking jaw is provided at its front end with a first scraping blade which is close to the seam mouth of the first friction welding junction interface, and the second chucking jaw is provided at its front end with a second scraping blade which is close to the seam mouth of the second friction welding junction interface.

Preferably, at a front end of at least one of the first and second chucking jaws, at least one external hole mouth surface scraping blade, which is close to the outer friction welding hole mouth, is provided.

Preferably, the scraping blades and/or the external hole mouth surface scraping blade are fixed to a front end of at least one of the first chucking jaw and the second chucking jaw by fastenings.

Preferably, a clearance between the scraping blades and the internal hole surface of the first workpiece is within 0.05~1 mm, preferably within 0.05~0.2 mm.

Preferably, the scraping blades and/or the external hole mouth surface scraping blade are fixed to a front end of at least one of the first chucking jaw and the second chucking jaw by fastenings, and are close up to the friction welding junction interface seam mouth, the scraping blades and/or the external hole mouth surface scraping blade are all made of an elastic metal materials.

The present invention also provides a friction welding machine comprising: a rotary driving device, a rotating speed adjusting device and an upset pressure regulating device, wherein the friction welding machine is equipped with the chucking device for friction-welding a structure assembly as described above.

Also, the present invention provides a water-cooled internal combustion engine cylinder head, the cylinder head including an intake valve stem receiving hole, an exhaust valve stem receiving hole, an intake duct, an exhaust duct, cylinder head bolt receiving holes, and a cylinder head cooling water chamber. The cylinder head is formed by integrating its upper cylinder head part and its lower cylinder head part which are manufactured separately. The intake valve stem receiving hole, the exhaust valve stem receiving hole, the intake duct, the exhaust duct, the cylinder head bolt receiving holes are formed respectively by friction-welding their upper portions which are formed on the upper cylinder head part and their lower portions which are formed on the lower cylinder head part together, via an intake valve stem receiving hole friction welding connecting part, an exhaust valve stem receiving hole friction welding connecting part, an intake duct friction welding connecting part, an exhaust duct friction welding connecting part and/or cylinder head bolt receiving hole friction welding connecting parts; the cylinder head cooling water chamber is formed by friction-welding its upper portion which is formed on the upper cylinder head part and its lower portion which is formed on the lower cylinder head part together via a lower cylinder head part bottom friction welding connecting part.

Preferably, the cylinder head includes a fuel injector receiving hole, and the fuel injector receiving hole is formed by friction-welding its upper portion which is formed on the upper cylinder head part and its lower portion which is formed on the lower cylinder head part together via a friction welding connecting part of the fuel injector receiving hole.

Preferably, the cylinder head includes a sparking plug receiving hole, and the sparking plug receiving hole is formed by friction-welding its upper portion which is formed on the upper cylinder head part and its lower portion which is formed on the lower cylinder head part together via a friction welding connecting part of the sparking plug receiving hole.

Preferably, at least one of the intake valve stem receiving hole, the exhaust valve stem receiving hole, the intake duct, the exhaust duct, the cylinder head bolt receiving holes and the cylinder head cooling water chamber is formed by a welding joint.

Further, the present invention provides an electric induction heated and welded structure assembly, comprising: a first workpiece, the first workpiece having a support shoulder and a first induction heated and deformed protrusion; a second workpiece, the second workpiece having a through-hole corresponding to the first workpiece, the second workpiece being supported, at its lower portion, on the support shoulder of the first workpiece, and the second workpiece having a second induction heated and deformed protrusion; and an electric induction heating coil which is positioned around both the first induction heated and deformed protrusion and the second induction heated and deformed protrusion, wherein the first induction heated and deformed protrusion and the second induction heated and deformed protrusion can be heated to their molten state by the electric induction heating coil, so that the first workpiece and the second workpiece are welded into an integral structure.

Still further, the present invention provides an electric induction heated and welded structure assembly, comprising: a first workpiece, the first workpiece having a support shoulder and a first induction heated and deformed protrusion; a second workpiece, the second workpiece having a through hole corresponding to the first workpiece, the second workpiece being supported, at its lower portion, on the support shoulder of the first workpiece, and the second workpiece has a second induction heated and deformed protrusion; and an electric induction heating coil which is positioned around both the first induction heated and deformed protrusion and the second induction heated and deformed protrusion, wherein the first induction heated and deformed protrusion and the second induction heated and deformed protrusion can be heated to their semi-molten state by means of the electric induction heating coil, and are squeezed/pressed by a tool and then become cool in a combined state, so that the first workpiece and the second workpiece are welded into an integral structure.

Preferably, at the root portion of the induction heated and deformed protrusion of the first workpiece, there is provided a groove, and at the root portion of the induction heated and deformed protrusion of the second workpiece, there is also provided a groove.

Yet further, the invention provides a water-cooled internal combustion engine cylinder head, the cylinder head including an intake valve a stem receiving hole, an exhaust valve stem receiving hole, an intake duct, an exhaust duct, cylinder head bolt receiving holes, and a cylinder head cooling water chamber; the cylinder head being formed by integrating its upper cylinder head part and its lower cylinder head part which are manufactured separately, wherein the intake valve stem receiving hole, the exhaust valve stem receiving hole, the intake duct, the exhaust duct, and the cylinder head bolt receiving holes are formed respectively by welding their upper portions which are formed on the upper cylinder head part and their lower portions which are formed on the lower cylinder head part together, this is realized by heating induction heated and deformed protrusions of the upper portions and induction heated and deformed protrusions of the lower portions to a molten state by means of the induction heating coil, and allowing the induction heated and deformed protrusions of the upper portions and the induction heated and deformed protrusions of the lower portions to be bonded with each other and hence being welded together; the cylinder head water chamber is formed by welding its upper portion which is formed on the upper cylinder head part and its lower portion which is formed on the lower cylinder head part together, this is realized by heating an induction heated and deformed protrusion of its upper portion and an induction heated and deformed protrusion of its lower portion to a molten state by means of the induction heating coil, and allowing the induction heated and deformed protrusion of the upper portion and the induction heated and deformed protrusion of the lower portion to be bonded with each other and hence being welded together.

Preferably, at least one of the intake valve stem receiving hole, the exhaust valve stem receiving hole, the intake duct, the exhaust duct, the cylinder head bolt receiving holes and the cylinder head cooling water chamber is formed by a welding joint.

Preferably, the cylinder head includes a fuel injector receiving hole, and the fuel injector receiving hole is formed by welding its upper portion which is formed on the upper cylinder head part and its lower portion which is formed on the lower cylinder head part together, this is realized by heating an induction heated and deformed protrusion of the upper portion and an induction heated and deformed protrusion of the lower portion to a molten state by means of the induction heating coil, and allowing the induction heated and deformed protrusion of the upper portion and the induction heated and deformed protrusion of the lower portion to be bonded with each other and hence being welded together.

Preferably, the cylinder head includes a sparking plug receiving hole, and the sparking plug receiving hole is formed by welding its upper portion which is formed on the upper cylinder head part and its lower portion which is formed on the lower cylinder head part together, this is realized by heating an induction heated and deformed protrusion of the upper portion and an induction heated and deformed protrusion of the lower portion to a molten state by means of the induction heating coil, and allowing the induction heated and deformed protrusion of the upper portion and the induction heated and deformed protrusion of the lower portion to be bonded with each other and hence being welded together.

Even further, the present invention provides a water-cooled internal combustion engine cylinder head, the cylinder head including an intake valve stem receiving hole, an exhaust valve stem receiving hole, an intake duct, an exhaust duct, cylinder head bolt receiving holes and a cylinder head cooling water chamber; the cylinder head being formed by integrating its upper cylinder head part and its lower cylinder head part which are manufactured separately, wherein the intake valve stem receiving hole, the exhaust valve stem receiving hole, the intake duct, the exhaust duct, and/or the cylinder head bolt receiving holes are formed by welding their upper portions which are formed on the upper cylinder head part and their lower portions which are formed on the lower cylinder head part together, respectively, this is realized by heating an induction heated and deformed protrusion of the upper portions and an induction heated and deformed protrusion of the lower portions to a semi-molten state by means of the induction heating coil and then squeezing/pressing the induction heated and deformed protrusions of the upper portions and the induction heated and deformed protrusions of the lower portions with a tool, and then allowing the first protrusions and the second protrusions which have been bonded together to become cool; and the cylinder head water chamber is formed by welding its upper portion which is formed on the upper cylinder head part and its lower portion which is formed on the lower cylinder head part together, this is realized by heating an induction heated and deformed protrusion of the upper portion and an induction heated and deformed protrusion of the lower portion to a semi-molten state by means of the induction heating coil, and then squeezing/pressing the induction heated and deformed protrusion of the upper portion and the induction heated and deformed protrusion of the lower portion with a tool, and then allowing the first protrusion and the second protrusion which have been bonded together to become cool.

Preferably, at least one of the intake valve stem receiving hole, the exhaust valve stem receiving hole, the intake duct, the exhaust duct, the cylinder head bolt receiving holes and the cylinder head cooling water chamber is formed by a welding joint.

Preferably, the cylinder head includes a fuel injector receiving hole, and the fuel injector receiving hole is formed by welding its upper portion which is formed on the upper cylinder head part and its lower portion which is formed on the lower cylinder head part together, this is realized by heating an induction heated and deformed protrusion of the upper portion and an induction heated and deformed protrusion of the lower portion to a semi-molten state by means of the induction heating coil, and then squeezing/pressing the induction heated and deformed protrusion of the upper portion and the induction heated and deformed protrusion of the lower portion with a tool, and then allowing the first protrusion and the second protrusion which have been bonded together to become cool.

Preferably, the cylinder head includes a sparking plug receiving hole, and the sparking plug receiving hole is formed by welding its upper portion which is formed on the upper cylinder head part and its lower portion which is formed on the lower cylinder head part together, this is realized by heating an induction heated and deformed protrusion of the upper portion and an induction heated and deformed protrusion of the lower portion to a semi-molten state by means of the induction heating coil, and squeezing/pressing the induction heated and deformed protrusion of the upper portion and the induction heated and deformed protrusion of the lower portion with a tool, and then allowing the first protrusion and the second protrusion which have been bonded together become cool.

Preferably, the upper cylinder head part is provided with a mounting seat for mounting a cam shaft thereon.

Preferably, the cylinder head as described above is mounted on a cylinder block.

Furthermore, the present invention provides a machine equipped with a water-cooled internal combustion engine, wherein it comprises the water-cooled internal combustion engine as described above.

BRIEF DESCRIPTION OF THE ACCOMPANYING DRAWINGS

The invention is now described in detail by embodiments with reference to the accompanying drawings.

DESIGNATION OF REFERENCE NUMBERS

Figure 1:
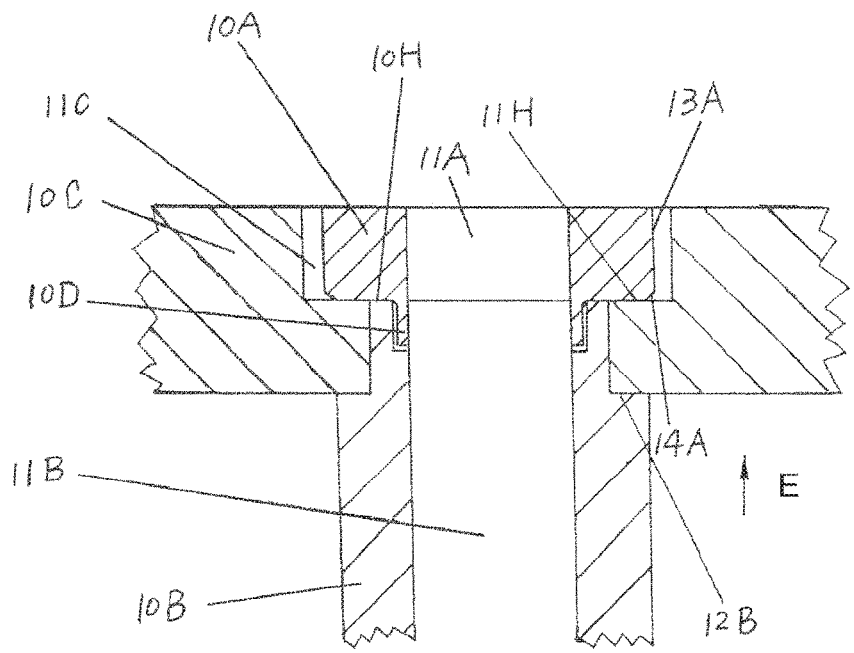
FIG. 1 is a sectional view of a friction-welded structure assembly.

10A—friction welding connecting part; 11A—internal hole of the friction welding connecting part; 12A—engaging edge of the friction welding connecting part; 13A—engaging corner of the friction welding connecting part; 14A—engaging bottom chamfer of the friction welding connecting part; 10B—first workpiece; 11B—internal hole of the first workpiece; 12B—support shoulder of the first workpiece; 10C—second workpiece; 11C—gap between the friction welding connecting part and the wall of a counterbore in the second workpiece; 10D—extended reinforcing portion of the friction welding connecting part; 10H—first friction welding junction interface; 11H—second friction welding junction interface; 12H—friction welding junction interface; 10—sparking plug; 12—sparking plug receiving hole; 912—friction welding connecting part for the sparking plug receiving hole; 14—weld joint around the sparking plug receiving hole; 18—combustion chamber; 20—piston; 30—induction heating coil; 70—engine block; 71—intake manifold; 72—water jacket in the engine block; 73—communication hole between the water jacket in the engine block and the water chamber in cylinder head; 75—fuel injector; 78—weld joint around fuel injector receiving hole; 750—fuel injector receiving hole; 9750—friction welding connecting part for the fuel injector receiving hole; 80—cylinder head; 81—communication hole between the water chamber in cylinder head and the water jacket in engine block; 83—cylinder head cooling water chamber; 85—cam shaft; 87—upper cylinder head part; 8701—flange; 8702—groove; 88—lower cylinder head part; 988—friction welding connecting part for the bottom of the lower cylinder head part; 9880—friction disk; 918—through hole in the friction welding connecting part for the bottom of the lower cylinder head part and in communication with the combustion chamber; 981—through water hole in the friction welding connecting part for the bottom of the lower cylinder head part; 8801—flange; 8802—groove; 831—water inlet; 832—water outlet; 881—cylinder head bolt receiving hole; 9881—friction welding connecting part for the cylinder head bolt receiving hole; 98810—gap between the friction welding connecting part for the cylinder head bolt receiving hole and the wall of a counterbore in the cylinder head; 8035—weld joint around the cylinder head bolt receiving hole; 887—intake duct; 9887—friction welding connecting part for the intake duct; 8037—weld joint around the intake duct; 889—exhaust duct; 9889—friction welding connecting part for the exhaust duct; 8038—weld joint around the exhaust duct; 8812—intake valve stem receiving hole; 98812—friction welding connecting part for the intake valve stem receiving hole; 8813—intake valve stem; 8032—weld joint around the intake valve stem receiving hole; 8822—exhaust valve stem receiving hole; 98822—friction welding connecting part for the exhaust valve stem receiving hole; 8823—exhaust valve stem; 8033—weld joint around the exhaust valve stem receiving hole; 8030—weld joint around the periphery of a junction interface between the upper cylinder head part and lower cylinder head part; 10K—rotary pressing jig; 11K—first chucking jaw; 12K—second chucking jaw; 11G—first scraping blade; 12G—second scraping blade; 11W—first external hole mouth surface scraping blade; 110K—first chucking jaw body; 120K—second chucking jaw body; 11J—clearance between the first scraping blade and the internal hole surface of the first workpiece; and 12J—clearance between the second scraping blade and the internal hole surface of the first workpiece.

DETAILED DESCRIPTION OF EMBODIMENTS OF THE INVENTION

Now, the present invention is described with reference to the accompanying drawings.

FIG. 1 shows a friction-welded structure assembly, including a first workpiece 10B, a second workpiece 10C and a friction welding connecting part 10A. The first workpiece 10B is inserted in a through hole corresponding thereto in the second workpiece 10C, the first workpiece 10B has a support shoulder 12B, on which is supported the lower surface of the second workpiece 10C. The friction welding connecting part 10A has a first friction welding junction interface 10H on its lower side which is in contact with a surface of the first workpiece 10B and also has a second friction welding junction interface 11H on its lower side which is in contact with a surface of the second workpiece 10C. The friction welding connecting part 10A is tightly pressed on both the first workpiece 10B and the second workpiece 10C which are positioned to be relatively corresponding and fixed to each other, while being moved against the two workpieces under a pressure, so as to increase the temperature of the first friction welding junction interface 10H and the second friction welding junction interface 11H. Then, the friction welding connecting part 10A is stopped under the pressure, and the first friction welding junction interface 10H and the second friction welding junction interface 11H become cool, thereby the first workpiece 10B and the second workpiece 10C are welded together to form a friction-welded structure assembly via the friction welding connecting part 10A. In the friction-welded structure assembly formed of the first workpiece 10B and the second workpiece 10C via the friction welding connecting part 10A, the internal hole 11A of the friction welding connecting part 10A is aligned with the internal hole 11B of the first workpiece 10B.

Figure 2:
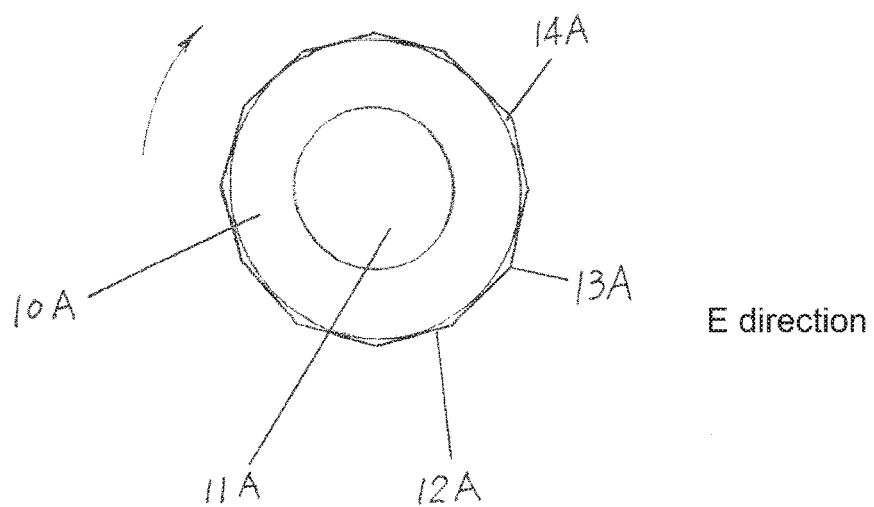
FIG. 2 is a bottom view of the friction-welded structure assembly in FIG. 1.

FIG. 2 shows the lower surface of the friction welding connecting part 10A, and the outside surface of one end of the friction welding connecting part 10A is provided with its engaging edges 12A. Alternatively, the internal hole surface of one end of the friction welding connecting part 10A is provided with its engaging edges 12A. The arrow in this figure indicates a selectable moving (including rotating) direction. The friction welding connecting part 10A has an extended reinforcing portion 10D.

Figure 3:
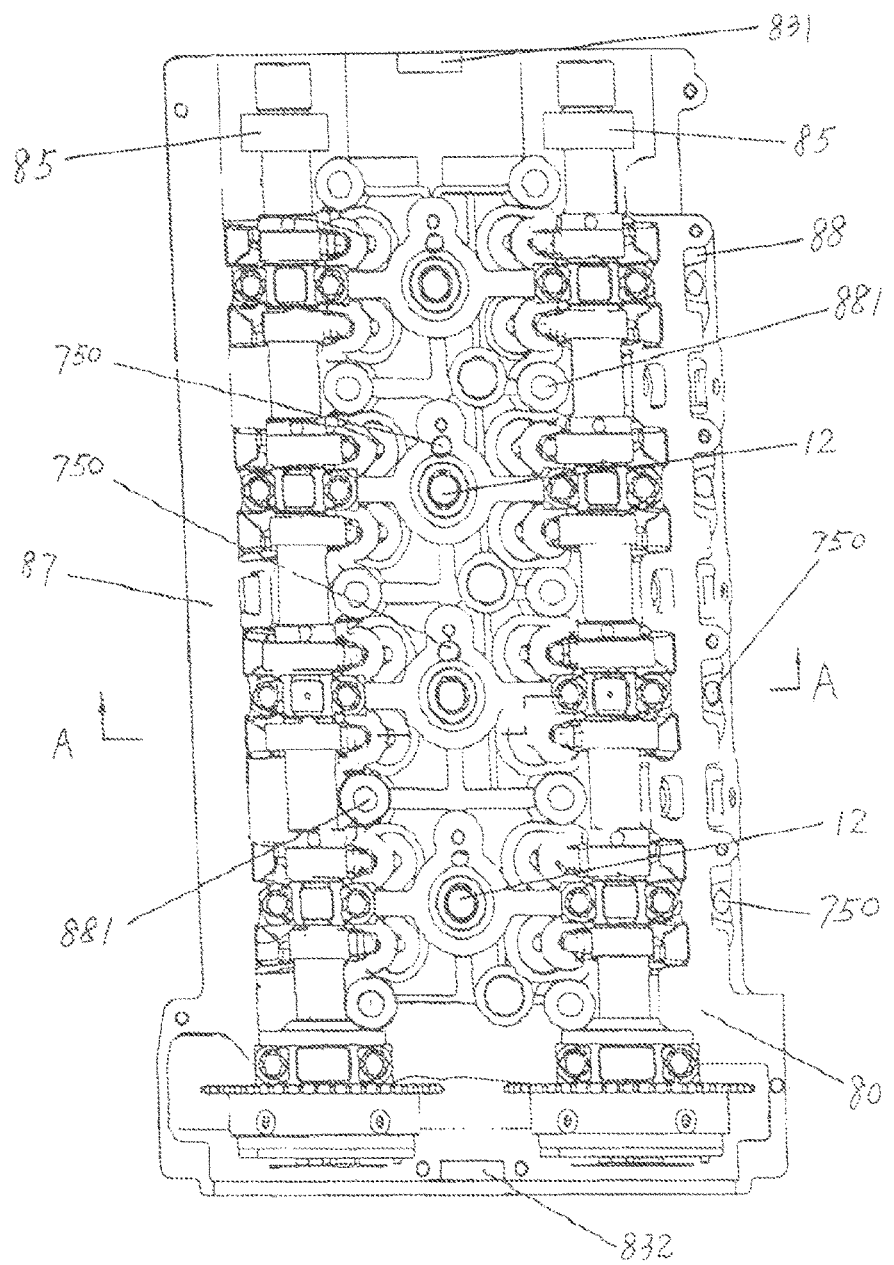
FIG. 3 is a top view of a 4-cylinder water-cooled internal combustion engine cylinder head with a sparking plug for ignition.

FIG. 3 is a top view of a 4-cylinder water-cooled internal combustion engine cylinder head with a sparking plug for ignition. Four valves of every cylinder are opened and closed by rotation of two cam shafts 85. In FIG. 3, two different positions of fuel injector receiving hole 750 are shown, that is, the fuel injector receiving holes 750, for a water-cooled internal combustion engine cylinder head with a centrally disposed direct-injection fuel injector, are shown on the left side of the figure and tilted or oblique fuel injector receiving holes 750 are shown on the right side of the figure. Either can be selected in practical use, or both can be used in combination, and either position or both positions can be used in the invention. In original design, all the through holes below the cam shafts 85 can be machined by rotating cutters, this is convenient to create a new friction-welded structure assembly and to add a friction welding connecting part to cover the hole mouths of the various holes at the junction interface between an upper cylinder head part and a lower cylinder head part. The friction welding connecting part is pressed tightly and rotated on the end faces of the hole mouths of both the upper and the lower cylinder head parts so as to heat the welding junction interfaces, and then the friction welding connecting part is stopped, and the welding junction interface becomes cool under the pressure. In this way, it is possible to quickly attain reliable, aesthetical and sealing weld joints. It is also practicable to use a friction welding connecting part of different materials from the upper and lower cylinder head parts made of aluminum or magnesium alloys, thereby enhancing the strength and hardness of the surface of the friction welding connecting part.

Figure 4:
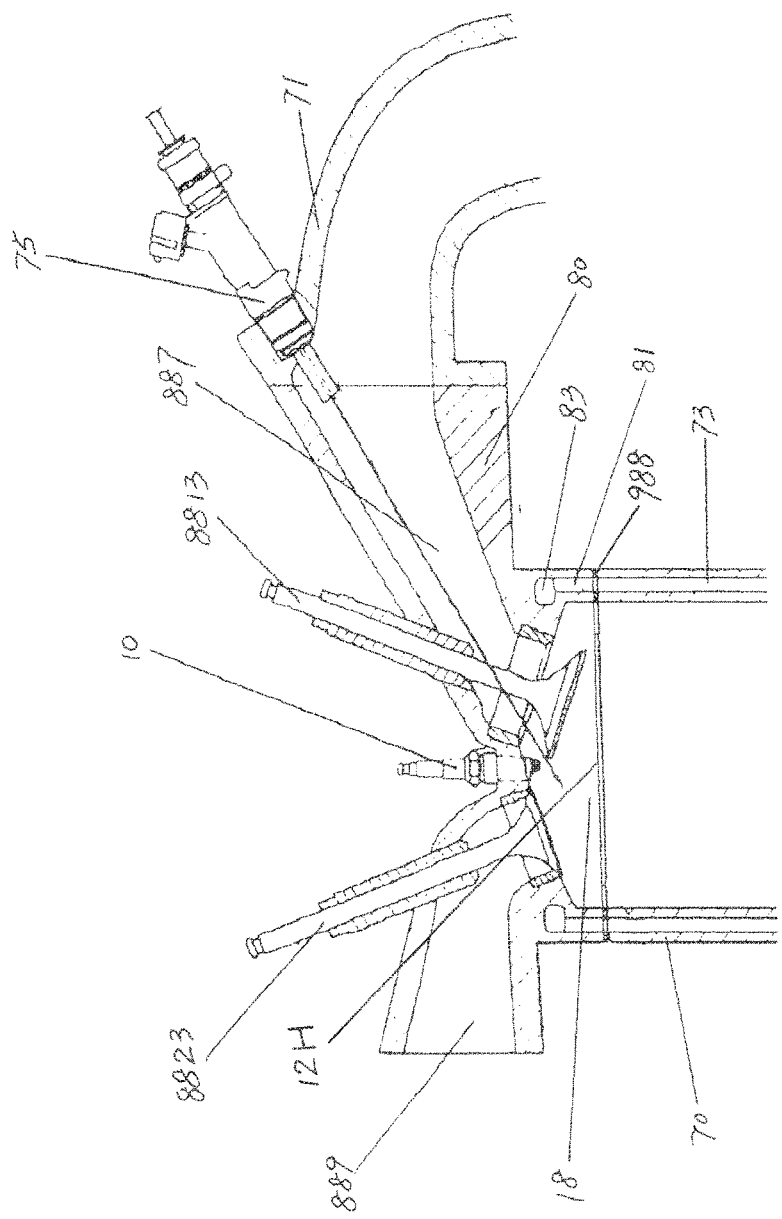
FIG. 4 is a sectional view of a water-cooled internal combustion engine cylinder head with a sparking plug for ignition.

FIG. 4 is a sectional view of a water-cooled internal combustion engine cylinder head with a sparking plug for ignition. Fuel is injected into an intake duct 887 and is mixed with fresh air therein, and then enters the engine cylinder through intake valves and is ignited for combustion. For sake of description, the fuel injector receiving hole 750 is not shown, so that the views for the cylinder head bolt receiving holes 881 and the upper portion of the cylinder head are omitted. A friction welding connecting part 988 for the bottom of the lower cylinder head part is provided with through holes which are in communication with a through water hole 81 between the cylinder head water chamber and engine block jacket and in communication with a through water hole 73 between the engine block jacket and the cylinder head water chamber, respectively.

Figure 5:
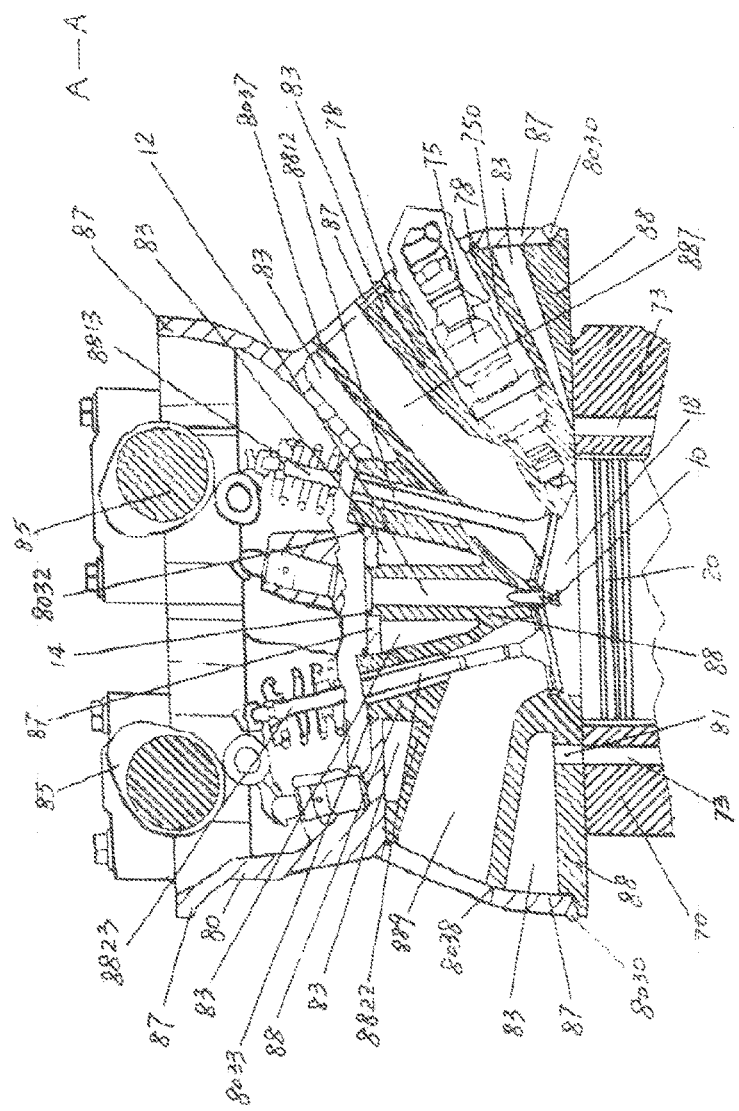
FIG. 5 is a sectional view of a water-cooled internal combustion engine cylinder head with a sparking plug for ignition and a fuel injector for directly injecting fuel into an engine cylinder.

FIG. 5 shows a water-cooled internal combustion engine cylinder head with a sparking plug for ignition and a fuel injector for directly injecting fuel into the engine cylinder, wherein the fuel injector is positioned on a side of the water-cooled cylinder head. As shown in the figure, a weld joint 8030 around the periphery of the junction interface between the upper cylinder head part and the lower cylinder head part is exposed on the outside surface of the cylinder head, so it is convenient for conducting an automatic welding by a low-cost argon arc welding process. Other weld joints, in particular, a weld joint 14 around the sparking plug receiving hole, a weld joint 78 around the fuel injector receiving hole, weld joints 8035 around the cylinder head bolt receiving holes, a weld joint 8032 around the intake valve stem receiving hole, and a weld joint 8033 around the exhaust valve stem receiving hole, are all below the cam shafts 85 and in compact and narrow spaces. For welding these junction interfaces by the automatic arc welding process, it is very difficult for the welding gun to reach the weld seam; also, it is very difficult for stirring needle of the friction stir welding process to reach the working areas, and thus it is necessary to use an innovative welding configuration and structure. Fortunately, such problems can be solved by the friction welding configuration and structure of the present invention. By means of the rotating friction welding process, it is easy to conduct high-speed welding operation and to attain reliable and aesthetical weld joints. Preferably, the hole mouths of both the intake duct and the exhaust duct are also designed as rounded as possible so as to be convenient for conducting friction welding.

Figure 6:
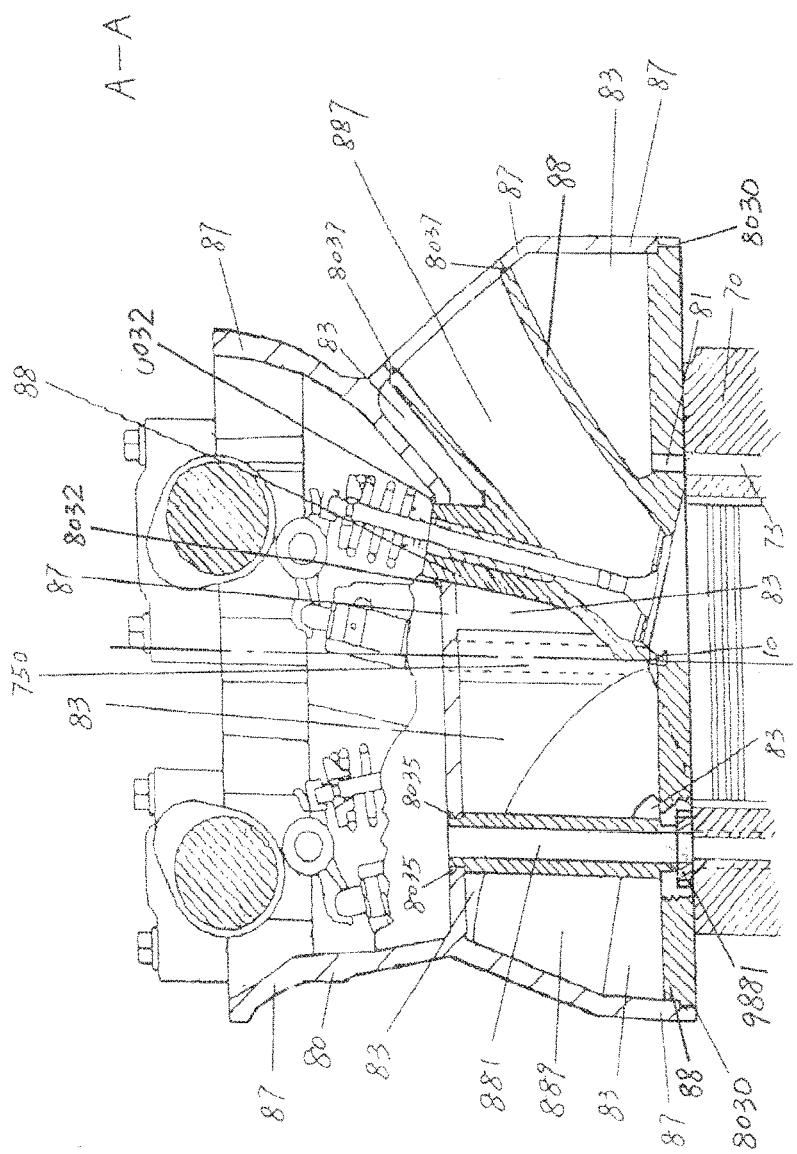
FIG. 6 is a sectional view of a water-cooled internal combustion engine cylinder head with a sparking plug for ignition and a fuel injector for directly injecting fuel into an engine cylinder.

FIG. 6 shows a water-cooled internal combustion engine cylinder head with a sparking plug for ignition and a fuel injector for directly injecting fuel into engine cylinder, wherein the injector and sparking plug is in a central concave portion of the bottom of the cylinder head which corresponds to the cylinder. As shown in the figure, the weld joint 8030 around the periphery of junction interface between the upper cylinder head part and lower cylinder head part is exposed on the outside surface of the cylinder head, the weld joint can be done by friction stirring welding process so as to connect the upper and lower cylinder head parts into an integral. Friction welding connecting parts 9881 for the cylinder head bolt receiving holes are provided at the bottom of the cylinder head. Cylinder head bolt receiving hole bodies are formed separately, then their lower ends are welded to the bottom of the cylinder head via the friction welding connecting parts 9881 by the friction welding process, and their upper ends are welded to the bottom of the cylinder head via weld joints 8035 by an ordinary welding process. As described here, this is an embodiment in which the upper cylinder head part and the lower cylinder head part are joined into an integral cylinder head by various welding processes in combination.

Figure 7:
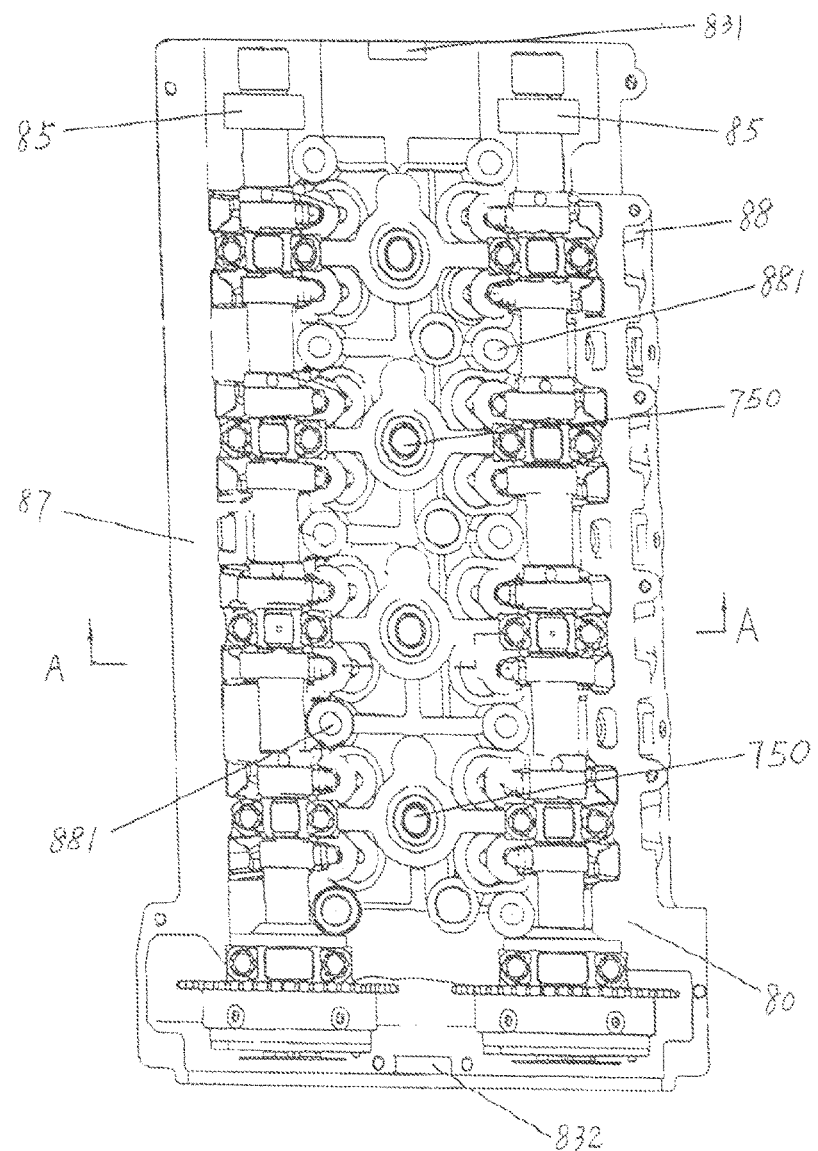
FIG. 7 is a top view of a 4-cylinder water-cooled internal combustion engine cylinder head without a sparking plug.

FIG. 7 is a top view of a 4-cylinder water-cooled internal combustion engine cylinder head without a sparking plug, wherein the cylinder head is applicable to compression ignition diesel engine without needing a sparking plug.

Figure 8:
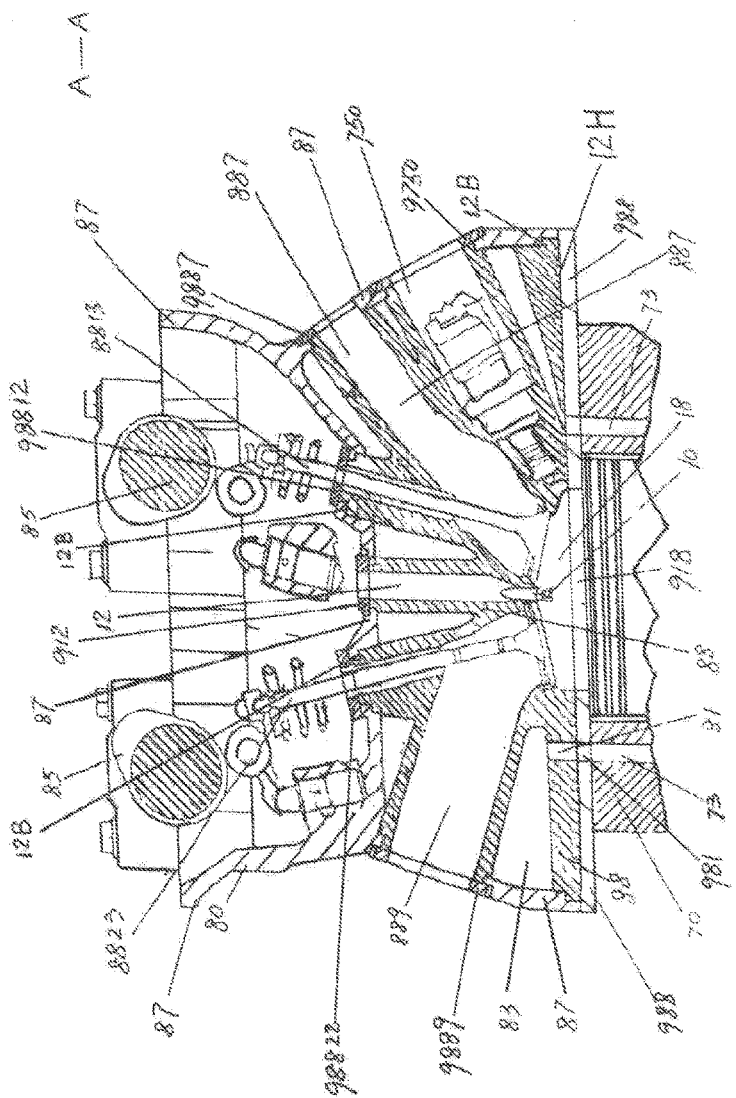
FIG. 8 is a sectional view of a water-cooled internal combustion engine cylinder head with a sparking plug for ignition and a fuel injector for directly injecting fuel into an engine cylinder.

FIG. 8 shows a water-cooled internal combustion engine cylinder head with a sparking plug for ignition and a fuel injector for directly injecting fuel into the engine cylinder, wherein the injector is positioned obliquely on a side of the water-cooled cylinder head. In this embodiment, all of the hole mouths are welded by the friction welding process, and each hole mouth to be welded is provided with a support shoulder 12B for bearing the pressure for conducting the friction welding. The lower cylinder head part 88 is inserted into a downward opening of the upper cylinder head part 87. A planar surface of the friction welding connecting part 988 for the bottom of the lower cylinder head part is pressed tightly on the connecting surfaces of the upper and lower cylinder head parts, so as to form a friction welding junction interface 12H. The planar surface of the friction welding connecting part 988 for the bottom of the lower cylinder head part, on one hand, and the connecting surfaces of the upper and lower cylinder head parts, on the other hand, are moved (including reciprocation and rotation) relatively, so that the friction welding junction interface 12H is heated. As the movement is stopped under the pressure, the friction welding junction interface 12H becomes cool, thereby the upper cylinder head part 87 and the lower cylinder head part 88 are friction-welded together at the junction interface via the friction welding connecting part 988. The friction welding connecting part 988 for the bottom of the lower cylinder head part is provided with through holes corresponding to the cylinder bore, water holes and cylinder head bolt receiving holes, respectively. It is also practicable to use a separate friction disk between the surface of the friction welding connecting part 988 and the connecting surfaces of the upper and lower cylinder head parts, and to move the friction disk relative to them (including reciprocation and rotation) under a pressure. The operation of such a friction welding comprises: using two side surfaces of one friction disk to rub against the planar surface of the friction welding connecting part 988 and the connecting surfaces of the upper and lower cylinder head parts simultaneously; alternatively, using an upper side surface and a lower side surface of two friction disks to rub against the planar surface of the friction welding connecting part 988 and the connecting surfaces of the upper and lower cylinder head parts simultaneously and respectively. The separated friction disk(s) is/are removed, the friction welding connecting part 988 for the bottom of the lower cylinder head part is tightly pressed on the connecting surfaces of the upper and lower cylinder head parts. The junction interface 12H becomes cool under the pressure. As a result, the upper cylinder head part 87 and the lower cylinder head part 88 inserted therein are welded together via the friction welding connecting part 988 for the bottom of the lower cylinder head part by the friction welding process. The outward end face of the intake valve stem sleeve, the outward end face of one portion of the intake valve stem receiving hole in the upper cylinder head part, and the outward end face of the other portion of the intake valve stem receiving hole in the lower cylinder head part, being three outward end faces in all, can be friction-welded so as to form a welded structure of the intake valve stem receiving hole via the friction welding connecting part 98812 for intake valve stem receiving hole, respectively. The outward end face of one portion of the exhaust valve stem receiving hole in the upper cylinder head part and the outward end face of the other portion of exhaust valve stem receiving hole in the lower cylinder head part, being two outward end faces in all, can be friction-welded so as to form a welded structure of the exhaust valve stem receiving hole via the friction welding connecting part 98822 for the exhaust valve stem receiving hole. An exhaust valve stem sleeve is separately and directly inserted in the exhaust valve stem receiving hole without using the friction welding. The above-mentioned two different friction-welded structures of the intake valve stem receiving hole and the exhaust valve stem receiving hole can be selected as desired. The hole mouths of the three, i.e., the intake duct 887, the exhaust duct 889 and the sparking plug receiving hole 12, and the holes of the three, i.e., the intake duct friction welding connecting part 9887, the exhaust duct friction welding connecting part 9889 and the sparking plug friction welding connecting part 912 are all preferably rounded at the junctions. For conducting welding and sealing of these ducts and receiving hole members, operations can be done as follows: pressing the planar surfaces of the intake duct friction welding connecting part 9887, the exhaust duct friction welding connecting part 9889 and the sparking plug friction welding connecting part 912 tightly on the hole mouth end faces of the intake duct 887, the exhaust duct 889 and the sparking plug receiving hole 12, respectively; rotating these friction welding connecting parts under a pressure, respectively, so as to heat the friction welding junction interfaces by friction heat; stopping the rotation under the pressure; allowing the junction interfaces to be cool. As a result, the above-said hole members are welded and sealed. Welding of any junction interfaces between the upper cylinder head part and the lower cylinder head part can be conducted by an arc welding or a friction stir welding; or by a rotating friction welding processes with an additional friction welding connecting part; or by a reciprocating friction welding process with an additional friction welding connecting part. That is, various welded structures and welding processes can be used in combination so as to attain optimum effects.

Figure 9:
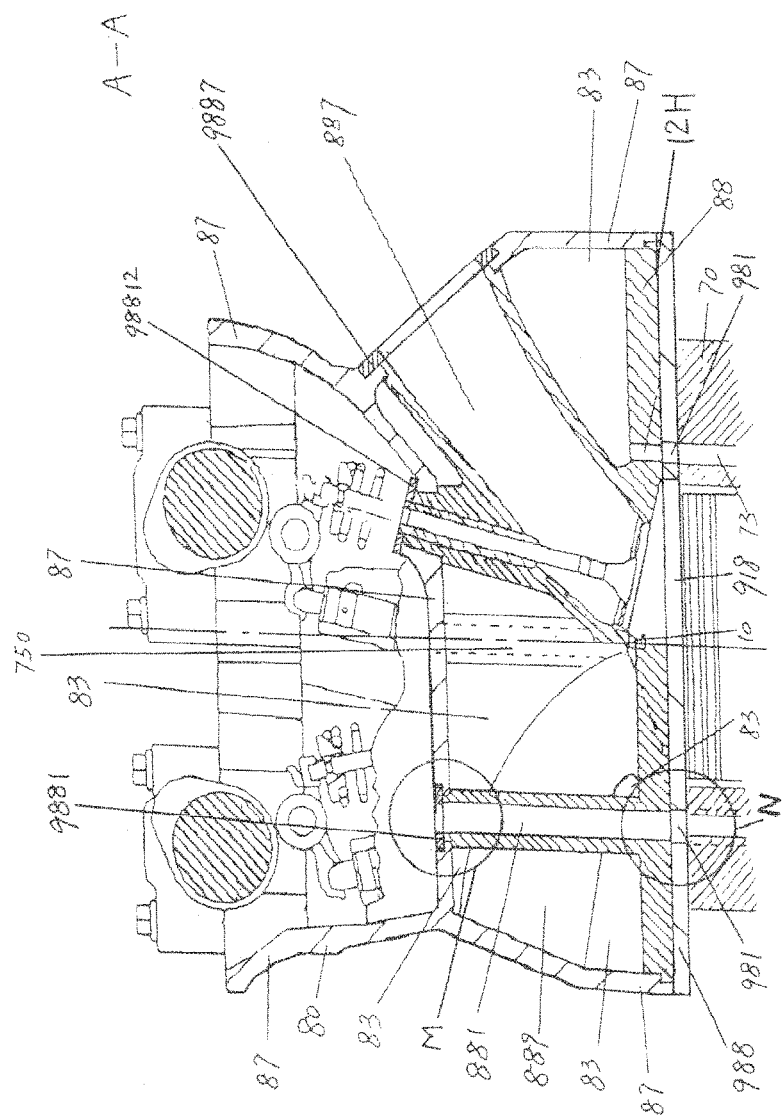
FIG. 9 is a sectional view of a water-cooled internal combustion engine cylinder head with a sparking plug for ignition and a fuel injector for directly injecting fuel into an engine cylinder.

FIG. 9 shows a water-cooled internal combustion engine cylinder head with a sparking plug for ignition and a fuel injector for directly injecting fuel into engine cylinder, wherein the injector and sparking plug is in a central concave portion of the bottom of the cylinder head which corresponds to the cylinder. If it is used for a compression ignition internal combustion engine, for example, a diesel engine, then the cylinder head does not need a sparking plug for ignition. At present, in a 4-valve internal combustion engine cylinder head, two intake duct branches for two intake valves of each cylinder are combined into one intake duct which is then screw-connected to an intake manifold. In this case, it is impossible to conduct demoulding in die casting. For using rotating friction welding to seal the junction interface of the intake duct hole mouths of the upper and lower cylinder head parts, if the hole mouths are not rounded or circular, it will be rather difficult. This precludes industrialized manufacture of water-cooled cylinder head configuration and structure. Therefore, it is necessary in original design to have the two intake duct branches of two intake valves of each cylinder directly extend to the outside surface of the cylinder head and directly connect to the intake manifold. If the air outlets of the manifold to cylinder head are designed to be rounded, then a precondition for conducting friction welding is created. The exhaust duct can be designed in the same way. The improvements described above are not only convenient for demoulding of die casting process, but also increase sectional areas of both intake and exhaust ducts so as to increase the intake air volume into cylinder and to expedite the air exhaust. Also, the outside surface area of the exhaust duct in contact with the cooling water is increased, this is advantageous to heat dissipation of the cylinder head. The lower cylinder head part 88 is inserted into the upper cylinder head part 87 through the downward opening of the latter, and the planar surface of the friction welding connecting part 988 for the bottom of the lower cylinder head part is pressed on the planar connecting surfaces of the upper and lower cylinder head parts so as to form a friction welding junction interface 12H. The friction welding connecting part 988 is moved, including reciprocation and rotation, relative to the upper and lower cylinder head parts 87 and 88 under a pressure so as to heat the junction interface 12H. As the movement is stopped under the pressure, the welding junction interface 12H becomes cool. Thus, friction welding is carried out between the connecting surfaces of the upper cylinder head part 87 and the lower cylinder head part 88 and the planar surface of the friction welding connecting part 988 for the bottom of the lower cylinder head part. The friction welding connecting part 988 is provided with through holes corresponding to the cylinder bore below the lower cylinder head part, water holes and cylinder head bolt receiving holes, respectively. The friction welding connecting part 988 can be made of materials different from aluminum alloys or magnesium alloys for the upper and lower cylinder head parts, so as to get even better technical and economical benefits.

Figure 10:
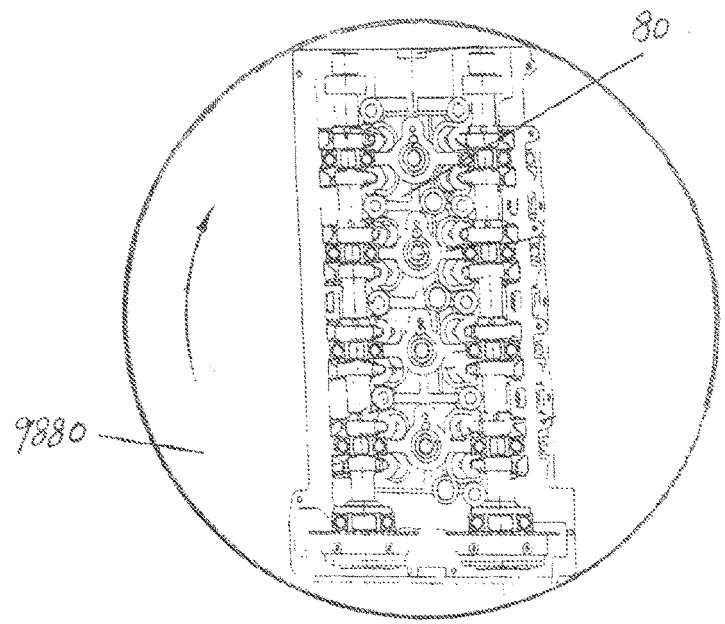
FIG. 10 is a top view of a 4-cylinder water-cooled internal combustion engine cylinder head, in which the arrow shows the rotating direction during friction welding.

FIG. 10 is a schematic view showing the friction welding for the bottom of a non-rounded cylinder head. Such a friction welding can be carried out as follows: tightly pressing a friction disk 9880 on the bottom of a cylinder head and making the disk rotate in the direction indicated by the arrow in the figure, so as to heat the welding junction interface of the cylinder head bottom; meanwhile, tightly pressing another friction disk 9880 on the friction welding connecting part 988 for the lower cylinder head part and making the disk rotate so as to heat the welding junction interface of the friction welding connecting part 988; while both the bottom of the cylinder head and the friction welding connecting part 988 rise to a preset welding temperature, removing the two friction disks 9880; allowing the bottom of the cylinder head and the friction welding connecting part 988 to become cool under the pressure. By the way, for getting to the preset welding temperature, the friction disks can conduct reciprocation instead of rotation.

Figure 11:
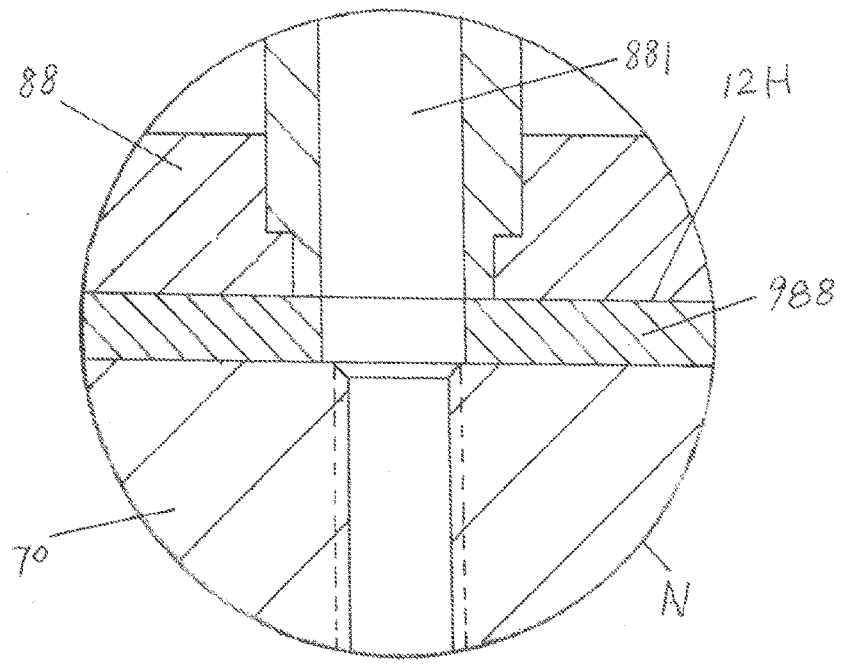
FIG. 11 is an enlarged view of a portion N in FIG. 9.

FIG. 11 shows an enlarged view of the portion N in FIG. 9. The flat surface of the friction welding connecting part 988 for the bottom of the lower cylinder head part is tightly pressed on the cylinder head bolt receiving hole 881 and the planar surface of the lower cylinder head part 88 so as to form a welding junction interface 12H. The friction welding connecting part 988 is moved, including rotation and reciprocation, against the cylinder head bolt receiving hole 881 and the lower cylinder head part 88 under a pressure, so as to heat the welding junction interface 12H. The movement is stopped, and then the welding junction interface 12H becomes cool under the pressure. Thus, the friction welding connecting part 988 for the bottom of lower cylinder head part, the cylinder head stud receiving hole 881 and the lower cylinder head part 88 are connected and sealed by the friction welding.

Figure 12:
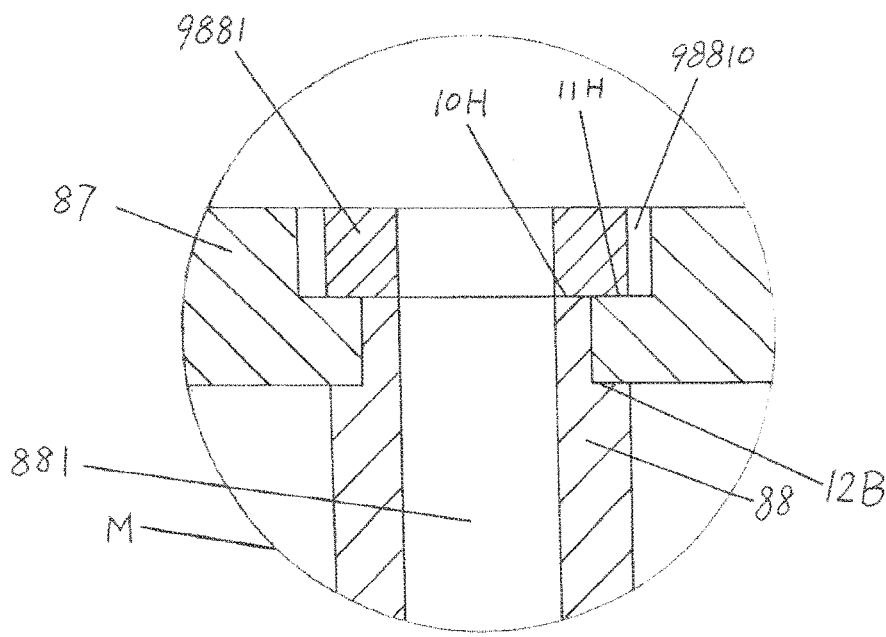
FIG. 12 is an enlarged view of a portion M in FIG. 9.

FIG. 12 shows an enlarged view of the portion M in FIG. 9. The cylinder head bolt receiving hole 881 is inserted in a through hole of the upper cylinder head part 87, and the support shoulder 12B supports the upper cylinder head part 87. The friction welding connecting part 9881 for the cylinder head bolt receiving hole is pressed tightly on the welding junction interfaces 10H and 11H and is rotated under a pressure so as to increase the temperature to a preset value. The rotation of the friction welding connecting part 9881 is stopped under the pressure. The temperature of the welding junction interfaces 10H and 11H are lowered, thereby realizing a sealing connection. A gap 98810 between the friction welding connecting part 9881 and the wall of a counterbore in the upper cylinder head part 87 should be wide enough for receiving a driving jig to rotate the friction welding connecting part 9881.

Figure 13:
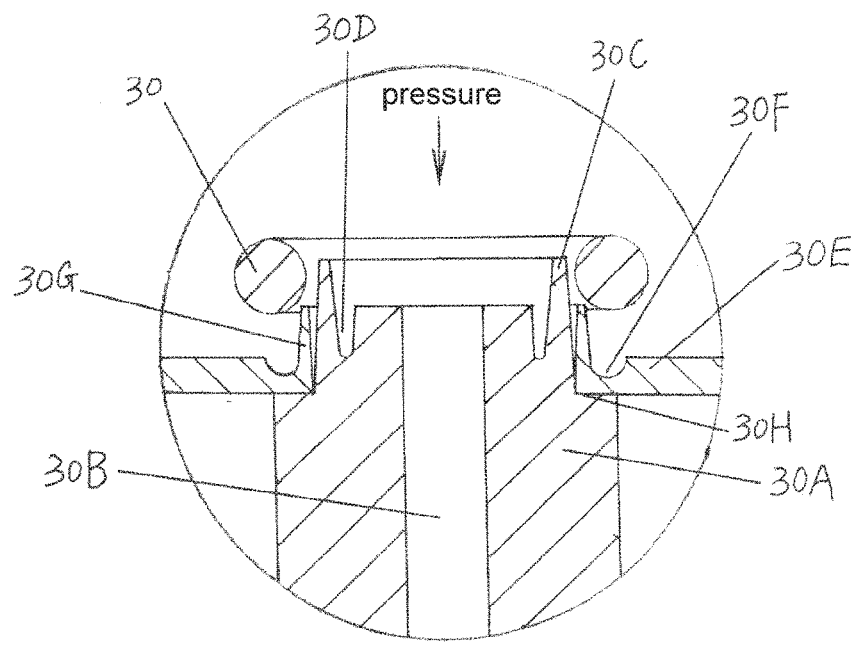
FIG. 13 is a sectional view of a structure assembly which can be heated and welded by electric induction.

FIG. 13 is a sectional view of a structure assembly which will be heated and welded by electric induction heating. It comprises: an induction heating coil 30, a first workpiece 30A and a second workpiece 30E, wherein the first workpiece 30A has an induction-heated and deformed protrusion 30C, the second workpiece 30E has an induction-heated and deformed protrusion 30G. The first workpiece 30A is inserted in a through hole corresponding thereto in the second workpiece 30E. The first workpiece 30A has a support shoulder 30H supporting the lower portion of the second workpiece 30E. The induction heating coil 30 is positioned around both the induction-heated and deformed protrusion 30C and the induction-heated and deformed protrusion 30G. Both the induction-heated and deformed protrusion 30C and the induction-heated and deformed protrusion 30G are heated by the induction heating coil 30 into a molten state, so that the first workpiece 30A and the second workpiece 30E are welded into an integrally welded structure assembly. Alternatively, an induction-heated structure assembly comprises an induction heating coil 30, a first workpiece 30A and a second workpiece 30E, wherein the first workpiece 30A has an induction-heated and deformed protrusion 30C, the second workpiece 30E has an induction-heated and deformed protrusion 30G. The first workpiece 30A is inserted in a through hole corresponding thereto in the second workpiece 30E. The first workpiece 30A has a support shoulder 30H supporting the lower portion of the second workpiece 30E. The induction heating coil 30 is positioned around both the induction-heated and deformed protrusion 30C and the induction-heated and deformed protrusion 30G. When both the induction-heated and deformed protrusion 30C and the induction-heated and deformed protrusion 30G are heated into a semi-molten state, the first workpiece 30A and the second workpiece 30E are squeezed/pressed by a tool and become cool in a combined state, thereby welding the first workpiece 30A and the second workpiece 30E into an integrally welded structure assembly. In the induction-heated and welded structure assembly described above, a groove 30D is provided at the root of the induction-heated and deformed protrusion 30C of the first workpiece 30A, and a groove 30F is provided at the root of the induction-heated and deformed protrusion 30G of the second workpiece 30E.

The invention is applicable to cylinder heads of both single-cylinder and multi-cylinder water-cooled internal combustion engines. Applying the invention to cylinder heads casted by light alloys can make engines have a more compact design, and obtain more precise, smooth and consistent intake and exhaust ducts. Also, it can increase the intake air volume entering the cylinder(s), make the mixing of the fuel with fresh air even better, improve the combustion quality, make the exhaust gas flow even smoother, and make the internal combustion engines more energy-saving and environment-friendly.

Now, some embodiments of a chucking device for welding the friction-welded structure assembly of the present invention will be described in the following. FIGS. 14-19 are views corresponding to FIG. 1 but turned 90 degrees clockwise.

The applicants of the invention have found that the extrudate generated during the friction welding becomes very hard and is difficult to be removed after it is cooled. It is time-consuming to arrange a special work procedure for removing the extrudate. For this reason, there is a need for the friction-welded structure assembly of the invention to have a chucking device which is capable of removing the extrudate simultaneously during the friction welding, so that the extrudate will have been removed as the friction welding process is finished, and the obtained weld joint is aesthetical and clean, thereby reducing work hours and costs.

Figure 14:
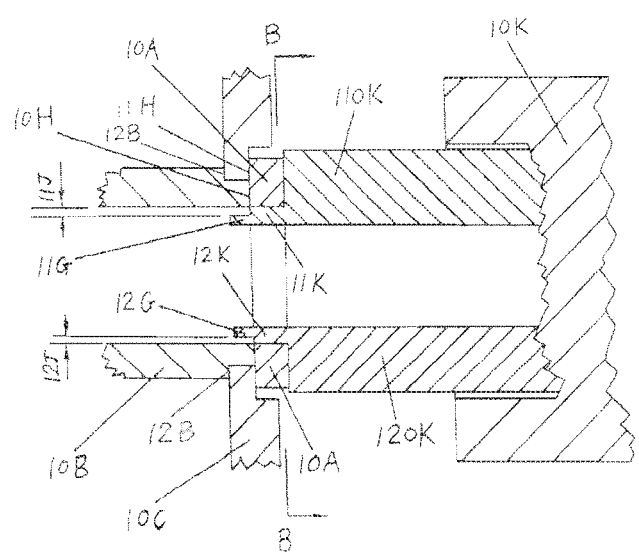
FIG. 14 is a sectional view of a chucking device, according to a first embodiment, used for the friction-welded structure assembly of the present invention.

FIG. 14 shows a first embodiment of the chucking device for welding the friction-welded structure assembly of the present invention. As shown in the figure, in a rotary pressing jig 10K, there are provided a first chucking jaw 11K and a second chucking jaw 12K which are radially adjustable. both the first and second chucking jaws 11K and 12K radially hold the friction welding connecting part 10A firmly, and the latter is pressed tightly on the friction welding junction interfaces of the first and second workpieces 10B and 10C. Both the first chucking jaw 11K and the second chucking jaw 12K are fixed to the rotary pressing jig 10K. In this embodiment, a first scraping blade 11G and a second scraping blade 12G are integrally extended from the first chucking jaw 11K and the second chucking jaw 12K, respectively, and are positioned near the seam mouth of the friction welding junction interfaces. As the rotary pressing jig 10K is driven to rotate under an axial pressure, it rotates both the first scraping blade 11G and the second scraping blade 12G the two blades will simultaneously scrape down the extrudate that is generated during the friction welding and not cooled yet. Thus, it is ensured to get an aesthetical and clean weld joint as the friction welding process is finished. A clearance 11J between the first scraping blade 11G and the internal hole surface of the first workpiece 10B is preferably within 0.05-0.20 mm; if the extrudate is overmuch, the clearance 11J can be widened to be within 0.2-0.35 mm, even to be 1 mm or so. A chip-breaking groove and a scraping inclination angle are properly designed in order to be capable of cutting off the extrudate easily and expelling the chips timely.

Figure 15:
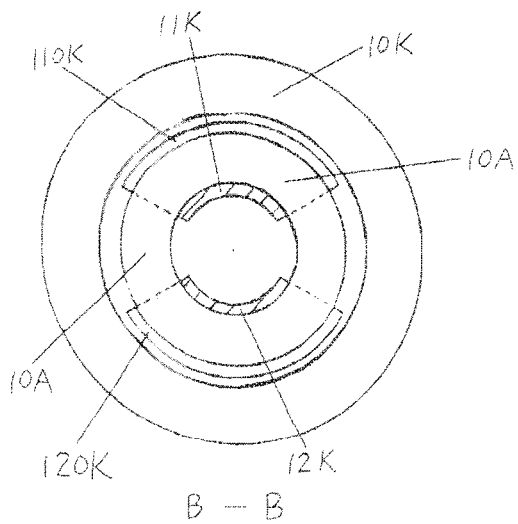
FIG. 15 is a left view of the chucking device used for the friction-welded structure assembly in FIG. 14.

As can be seen clearly in FIG. 15, the first chucking jaw 11K and the second chucking jaw 12K hold the friction welding connecting part 10A firmly. If necessary, the number of the chucking jaw can be increased to 3, 4 or more, all of which are feasible.

Figure 16:
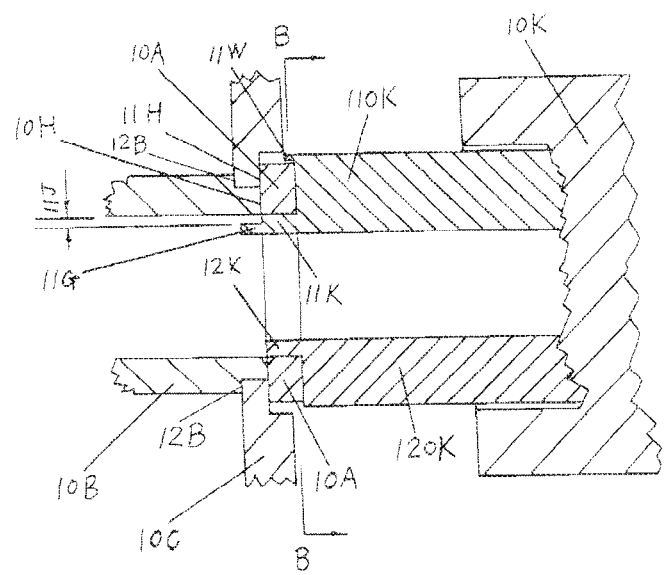
FIG. 16 is a sectional view of a chucking device, according to a second embodiment, used for the friction-welded structure assembly of the present invention.

FIG. 16 shows a second embodiment of the chucking device for welding the friction-welded structure assembly of the present invention. In this embodiment, there is provided only one scraping blade, that is, the first scraping blade 11G. In this case, it is also capable of simultaneously removing the extrudate out of the hole of the friction-welded structure assembly. In addition, there is provided a first external hole mouth surface scraping blade 11W which is extended from the first chucking jaw 11K and is near the external hole mouth surface, this scraping blade can remove the extrudate beyond the external hole mouth surface.

Figure 17:
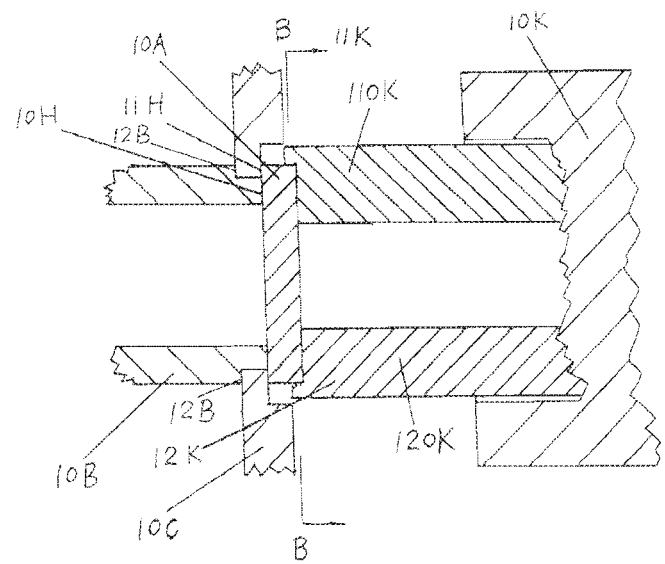
FIG. 17 is a sectional view of a chucking device, according to a third embodiment, used for the friction-welded structure assembly of the present invention.

FIG. 17 shows a third embodiment of the chucking device for welding the friction-welded structure assembly of the present invention. In this embodiment, the friction welding connecting part 10A has no through hole, the first chucking jaw 11K and second chucking jaw 12K hold the friction welding connecting part 10A firmly on its outside to conduct friction welding. The ends of the first chucking jaw 11K and the second chucking jaw 12K can be provided with a scraping blade (not shown), respectively, for removing extrudate beyond the external hole mouth surface.

Figure 18:
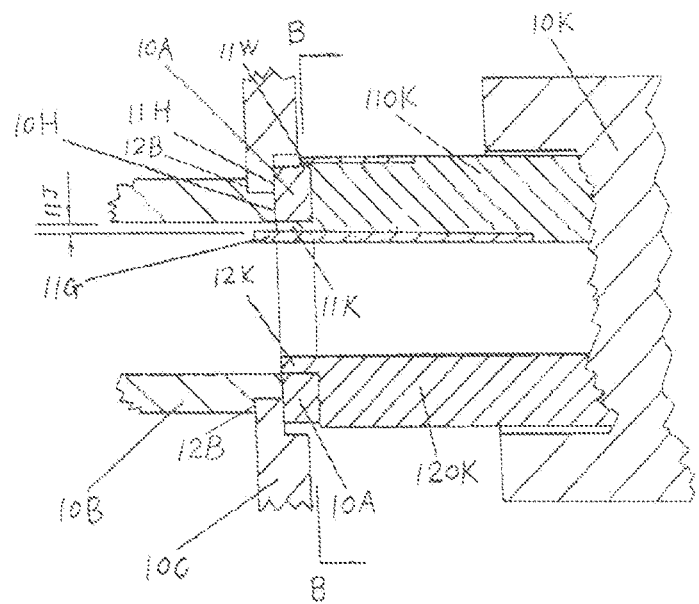
FIG. 18 is a sectional view of a chucking device, according to a fourth embodiment, used for the friction-welded structure assembly of the present invention.

FIG. 18 shows a fourth embodiment of the chucking device for welding the friction-welded structure assembly of the present invention. In this embodiment, to facilitate replacement, a first scraping blade 11G is fixed in a removable way to the front end of the first chucking jaw 11K by fastenings and is positioned near to the seam mouth of the friction welding junction interface. Further, as in the second embodiment, there is also provided an external hole mouth surface scraping blade 11W which is extended from the first chucking jaw 11K and is positioned near the external hole mouth surface. However, there is a difference that the scraping blade 11W in this embodiment is removably fixed to the front end of the first chucking jaw 11K by fastenings.

Figure 19:
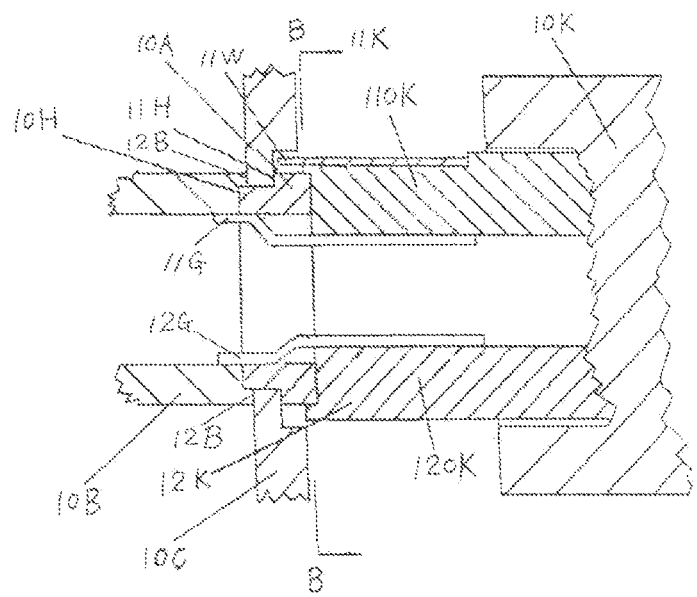
FIG. 19 is a sectional view of a chucking device, according to a fifth embodiment, used for the friction-welded structure assembly of the invention.

FIG. 19 shows a fifth embodiment of the chucking device for welding the friction-welded structure assembly of the present invention. In this embodiment, as in the third embodiment above, at the front end of the first chucking jaw 11K, there is provided an external hole mouth surface scraping blade 11W which is fixed in position by fastenings and is close up to the seam mouth of the friction welding junction interfaces. Moreover, in this embodiment, at the front end of the first chucking jaw 11K and the second chucking jaw 12K are provided a first elastic scraping blade 11G and a second elastic scraping blade 12G respectively, which are close up to the seam mouth of the friction welding junction interfaces. Difference from the embodiments described above is that, the first scraping blade 11G and second scraping blade 12G in this embodiment are made of an elastic metal, so that they will press with a proper pressure on the seam mouth of the friction welding junction interfaces by means of metal elasticity as the rotary pressing jig 10K rotates, thereby giving even better result for simultaneously scraping off the extrudate. In addition, as shown in the figure, the friction welding connecting part 10A in this embodiment has a step-like structure, therefore, its friction welding junction interface 10H and friction welding junction interface 11H are at different heights. As shown in the figure, the height difference between the two junction interfaces 10H and 11H is beyond the end face of the internal hole of the second workpiece 10C, such a configuration of the friction welding connecting part 10A is more advantageous to the end-to-end butting joints between the hole mouths of the intake duct hole member, the exhaust duct hole member and the inclined injector receiving hole member in the upper cylinder head part 87, on one hand, and the hole mouths of the intake duct hole member, the exhaust duct hole member and the inclined injector receiving hole member in the lower cylinder head part 88, on the other hand. With such a configuration, it is easy to carry out the friction welding for those butting joints without any difficulty and without a need of elastic deformation of materials at all the hole mouths in the upper and lower cylinder head parts 87 and 88. As shown in FIGS. 8 and 9, when the hole mouths of the intake duct hole member, the exhaust duct hole member and inclined injector receiving hole member in the lower cylinder head part 88 are fitted to the hole mouths of the intake duct hole member, the exhaust duct hole member and the inclined injector receiving hole member in the upper cylinder head part 87, it is necessary to rely on the elastic deformation of the areas in contact with each other, this may cause cracking, bursting apart or burring of the hole mouths, even may damage them. In contrast, by using a friction welding connecting part 10A having a friction welding junction interface 10H and a friction welding junction interface 11H which are at different heights, and because of the friction welding junction interface 10H being beyond the end face of the internal hole of the second workpiece 10C, the problems which may cause cracking, bursting apart or burring of the hole mouths, even damaging them can be removed when the upper cylinder head part and the lower cylinder head part are fitted together.

It should be understood that, in order to hold a friction welding connecting part 10A firmly, at least two chucking jaws are necessary, however, the number of the chucking jaw can be increased as desired. In order to scrape off the extrudate simultaneously in the rotary pressing step during the friction welding, at least one scraping blade is necessary, however, the number of the scraping blade can be increased as desired. For saving cost, those scraping blades prone to be worn out can be designed not integrated with the chucking jaws, but manufactured separately and then fixed to the chucking jaws by fastenings.

In the above-described embodiments of the chucking device for welding the friction-welded structure assembly of the present invention, scraping blades rotate simultaneously with the chucking jaws. The scraping blades can scrape off the extrudate before the extrudate cools to the ambient temperature, so that it can avoid the trouble that the extrudate is difficult to be removed after being cooled and hardened.

In this description, the terms such as 'upper', 'lower', 'right', 'left' and the like indicate a relative direction and position only, but have no specific limits.

While the present invention has been described via the preferred embodiments above, it should be understood that the skilled person in the art can make various changes or modifications based on the contents disclosed herein. For example, the friction-welded structure assembly of the invention can be used in combination with some non-friction-welding process for producing cylinder heads; as to the chucking device described above, it can have scraping blades of any number (at least one), elastic scraping blades and non-elastic ones can be used in combination, further, the scraping blades of any number and any type, on one hand, and the external hole mouth surface scraping blades of any number and any type, on the other hand, can be used in combination; the friction welding junction interfaces can be planar or curved. Therefore, the scope of the invention is not limited to the specific description herein but is defined by the appended claims.

What is claimed is:

1. A friction-welded structure assembly, comprising:
 a first workpiece, said first workpiece having a first support shoulder notch and a second support shoulder notch;

a second workpiece, said second workpiece having a through hole corresponding to said first workpiece, and said second workpiece being supported at its lower portion on the first support shoulder notch of said first workpiece; and a friction welding connecting part having an extended reinforcing portion being supported on the second support shoulder notch of said first workpiece, said friction welding connecting part (10A) having, at its lower portion, a first friction welding junction interface (10H) which is in contact with a surface of said first workpiece (10B), and a second friction welding junction interface (11H) which is in contact with a surface of said second workpiece (10C), wherein said friction welding connecting part (10A) is tightly pressed on both said first workpiece (10B) and said second workpiece (10C) which are positioned to be relatively corresponding and fixed to each other while being moved under a pressure, so as to heat said first friction welding junction interface (10H) and said second friction welding junction interface (11H), then said friction welding connecting part (10A) is stopped under the pressure, and said first friction welding junction interface (10H) and said second friction welding junction interface (11H) become cool, thereby said first workpiece (10B) and said second workpiece (10C) are welded together to form the friction-welded structure assembly via said friction welding connecting part (10A), and wherein said friction welding connecting part (10A) has an axially step-like shape so that said first friction welding junction interface (10H) and said second friction welding junction interface (11H) of said friction welding connecting part (10A) are in axially height-different planar surfaces and/or curved surfaces.

2. The friction-welded structure assembly according to claim 1, wherein said first workpiece (10B) has a first workpiece internal hole (11B), and said friction welding connecting part (10A) has a friction welding connecting part internal hole (11A), in the friction-welded structure assembly formed by welding said first workpiece (10B) and said second workpiece (10C) via said friction welding connecting part (10A), said friction welding connecting part internal hole (11A) is aligned with said first workpiece internal hole (11B).

3. The friction-welded structure assembly according to claim 1, wherein said friction welding connecting part (10A) is provided with engaging edges (12A) on an outside wall of one end thereof and/or on an inside wall of one end thereof.

4. The friction-welded structure assembly according to claim 1, wherein said friction welding connecting part (10A) is tightly pressed on both said first workpiece (10B) and said second workpiece (10C) which are positioned to be relatively corresponding and fixed to each other, while being rotated or reciprocated under a pressure.

5. The friction-welded structure assembly according to claim 1, wherein said first workpiece (10B), said second workpiece (10C) and/or said friction welding connecting part (10A) are made of metal materials and/or synthetic materials.

6. The friction-welded structure assembly according to claim 5, wherein said first workpiece (10B), said second workpiece (10C) and/or said friction welding connecting part (10A) are made of aluminum alloys, magnesium alloys and/or titanium alloys.

* * * * *